July 30, 1968  J. L. REIMERS ET AL  3,394,793
HYDROSTATIC COOKER CONVEYOR
Filed Feb. 10, 1967
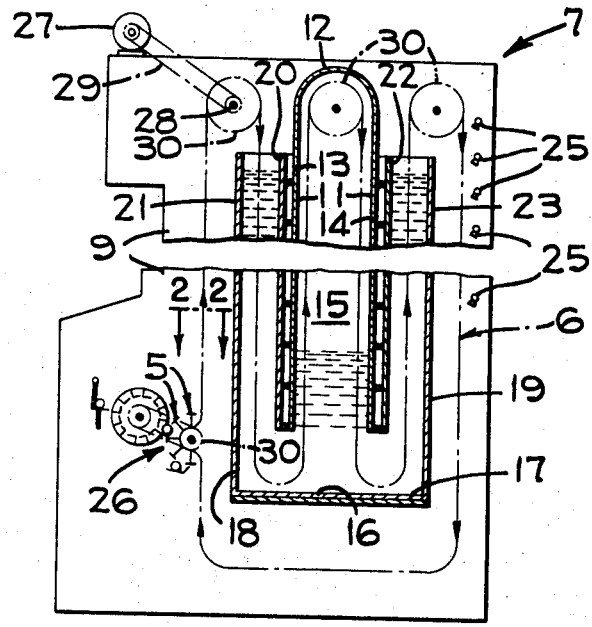
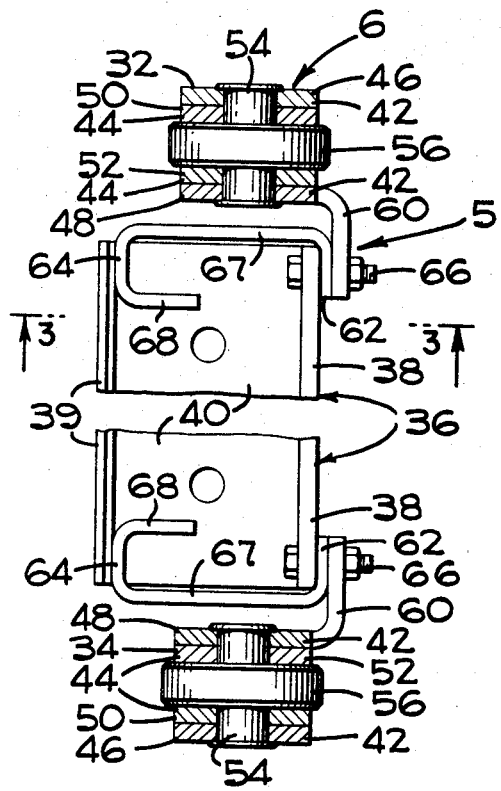
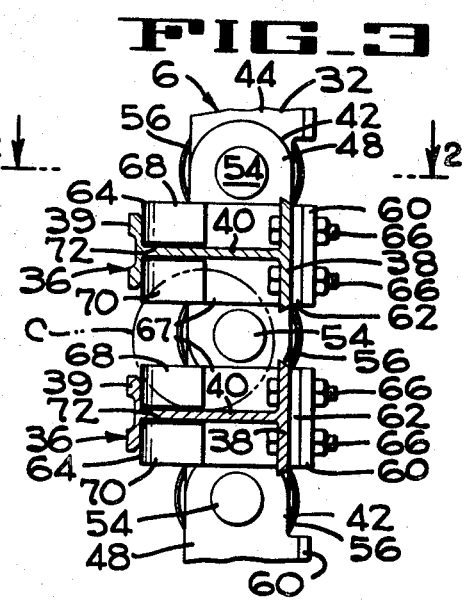
INVENTORS.
JAMES L. REIMERS
ADIL A. MUGHANNAM
BY
Francis W. Anderson
ATTORNEY … # 3,394,793
HYDROSTATIC COOKER CONVEYOR
James L. Reimers and Adil A. Mughannam, San Jose, Calif., assignors to FMC Corporation, San Jose, Calif., a corporation of Delaware
Filed Feb. 10, 1967, Ser. No. 615,153
7 Claims. (Cl. 198—131)

ABSTRACT OF THE DISCLOSURE

A hydrostatic cooker conveyor having a plurality of carriers connected at opposite ends to a pair of endless chains by carrier attachment apparatus. The carriers are secured to connectors and to outwardly bent tabs of the chain links in cantilever fashion, and the attachment apparatus serves to relieve the carriers of excessive strains due to their cantilever loading while also serving as container abutment end plates.

Background of the invention

This invention pertains to an improved processing conveyor for hydrostatic cookers and more particularly relates to carrier attachment apparatus and carrier connectors for attaching each end of a carrier to the associated links of the endless chains of the processing conveyor of a hydrostatic cooker. The subject conveyor is designated for use in the type of cooker disclosed in U.S. Letters Patent to Lee, 3,286,619 which issued on Nov. 22, 1966, or may be substituted for the type of conveyor disclosed in U.S. Letters Patent 3,067,850 which issued to French on Dec. 11, 1962.

The processing conveyor of this type of cooker include a plurality of carriers each of which is usually about seven feet long and supports in excess of about 60 pounds of filled containers being processed. The carriers are evenly spaced along the processing conveyor and the processing conveyor has a plurality of vertical runs that are about 60 feet tall. The conveyor is continuously driven along a circuitous path so that each carrier receives a row of containers at substantially atmospheric pressure, advances the carriers and containers downwardly into a preheating housing which gradually heats the containers and carriers to about 238° F., then advances the carriers and containers upwardly and thereafter downwardly through a steam chamber maintained at about 250° F., then moves the containers and carriers upwardly through a housing filled with a column of water which gradually cools the containers and carriers to about 210° F., then moves the containers and carriers past cooling sprays of water at about 60° F. before again returning the carriers to a feed and discharge station where the rows of processed containers are discharged and new rows of unprocessed containers are fed into each carrier at which time the above cycle of operation is again repeated.

It has been determined that hydrostatic cooker conveyors frequently break at welded or unduly strained portions thereof thereby requiring objectionable shut down of the cooker for repairs. Although it is not completely understood why the breakage occurs, it is noted that the breakage occurs primarily at the welded joints and secondarily at the highly stressed points of the conveyor. It is believed that this breakage is caused by the repeated expansion and contraction of the links and carriers due to the substantial changes of temperature acting thereon during each cycle of operation. This repeated expansion and contraction first tends to open cracks at welded joints and also at highly stressed areas of the chain links and carrier ends, and thereafter tends to gradually enlarge the cracks causing subsequent breakage. Enlargement of the cracks and subsequent breakage is accelerated by vibrations inherent in the heavily loaded chains and by corrosive and electrolytic action of the heat treatment mediums acting on the metal parts of the conveyor.

Summary of the invention

The conveyor of the present invention is designed to overcome this breakage problem by providing carrier attachment apparatus which apparatus is devoid of welds and which apparatus is designed to minimize the localization of high stresses in the carrier bars. The attachment apparatus is also designed to minimize the damaging effect of vibrations on the heavily loaded carriers by mounting each end of each carrier to an associated chain link tab in cantilever manner and by reducing the stresses inherent in such cantilever mounting by producing a combined supporter and container stop which is likewise bolted in cantilever manner to the tab but which is of rigid beam construction and is in contact with the unsupported edge of the associated carrier to relieve strains therein due to the cantilever type of mounting.

Brief description of the drawings

FIGURE 1 is a diagrammatic central vertical section through a hydrostatic cooker illustrating the path of travel of the conveyor therethrough, the central portion of the cooker being cut away.

FIGURE 2 is an enlarged horizontal section taken along lines 2—2 of FIGURES 1 and 3 illustrating the manner of mounting a carrier on two endless chains of a hydrostatic cooker, the central portion of the carrier being removed.

FIGURE 3 is a vertical section taken along lines 3—3 of FIGURE 2 through two carriers and illustrates the spacing between the carriers and the manner in which the carrier supporter relieves the cantilever loading on the carriers.

Description of preferred embodiment

The improved carrier attachment apparatus 5 (FIGS. 2 and 3) of the endless processing conveyor 6 of the present invention is continuously driven through the processing chambers of a hydrostatic cooker 7 (FIG. 1). The hydrostatic cooker 7 comprises a pair of spaced vertical support walls 9 (only one wall being shown) that are supported in spaced parallel position. A housing 11, which extends between the two walls 9, has a rounded upper end 12 and two depending walls 13 and 14 which cooperate with the two walls 9 to define a cooking chamber 15 which is filled with steam at a predetermined cooking pressure and temperature, for example, at about 250 degrees F. and 15 p.s.i. gauge. The lower end of the housing 11 opens into a water filled trough 16 which is formed by the two walls 9, a transverse horizontal plate 17 and the lower end portions of two transverse vertical walls 18 and 19. The wall 18 cooperates with another transverse vertical wall 20 to define an inlet hydrostatic water leg 21, and the wall 19 cooperates with a transverse vertical wall 22 to provide an outlet hydrostatic leg 23. The hydrostatic legs 21 and 23 communicate with the trough 16 and are filled with water so as to create sufficient pressure to resist the pressure of steam in the cooking chamber 15. The inlet hydrostatic water leg 21 is thermostatically controlled to provide a gradually increasing water temperature from approximately 210° F. at its upper end to approximately 245° F. at its lower end. The outlet water leg 23 is also thermostatically controlled to provide a gradual decrease in water temperature from approximately 245° F. at its lower end to any suitable temperature below the boiling point of water at atmospheric pressure, depending upon the type of containers being handled, at the upper end thereof. Steam is added to the water in the hydrostatic inlet leg 21 to provide the desired heating temperature therein, and cooled water is directed into the outlet or cooling leg 23 to provide the desired cooling temperature therein. The containers and the processing conveyor 6 may additionally be cooled by spray cooled water at about 60° F. thereon from nozzles 25 as the processed containers move from the upper end of the outlet leg 23 to a feed and discharge station 26.

The processing conveyor 6 is continuously driven by a motor 27 which is connected to a drive shaft 28 by a chain drive 29. As indicated in FIGURE 1, the processing conveyor 6 is trained around sprockets 30 that are rotatably supported by the vertical walls 9, and is guided along a circuitous path by guide rails (not shown).

The processing conveyor 6 comprises a pair of spaced, parallel endless chains 32 and 34 (FIG. 2) to which are mounted a plurality of evenly spaced I-beam carriers 36. Each carrier is about 7 feet long and is arranged to cooperate with the next adjacent carrier to support a row of containers C therein as indicated in FIGURE 3. Each carrier includes a wide support or mounting flange 38, a narrow container retaining flange 39 and a web 40 interconnecting the two flanges. The wide flange 38 and narrow flange 39 cooperate to retain rows of containers on each carrier when moving along linear paths or around arcuate paths of relatively large diameters. When the carriers are moved around a sharp arcuate path at the feed and discharge station 26, the narrow flanges 39 become spaced from each other a sufficient distance apart to permit rows of containers to be fed into and be discharged from the carriers.

The chains 32 and 34 are identical, and each chain comprises a plurality of pivotally interconnected wide and narrow links 42 and 44. Each wide link 42 includes an outer bar 46 and an inner bar 48, and each narrow link includes an outer bar 50 and an inner bar 52. As indicated in FIGURE 2, one end of the outer bar 46 and inner bar 48 of each wide link 42, and the adjacent ends of the outer bar 50 and inner bar 52 of the adjacent narrow link 44 are pivotally mounted on a pivot pin 54. A roller 56 is also journalled on the pivot pin 54 and is disposed between the bars 50 and 52 as clearly illustrated in FIGURE 2.

Since the carrier attachment apparatus 5 of the present invention is substantially the same for both the wide and the narrow links, only the attachment apparatus 5 of the wide link 42 will be described in detail.

The carrier attachment apparatus 5 includes a tab 60 which is formed integrally with and is bent inwardly from the inner bar 48 of the associated link. The tab 60 has a pair of spaced bolt holes near its free end which are aligned with similar holes in the wide flange 38 of the associated carrier 36 and in a mounting flange 62 of a combination container stop and carrier supporter 64. Bolts 66 extend through the above mentioned holes and cooperate with nuts for firmly connecting the carrier flange 38, tab 60 and mounting flange 62 together as a unit.

The container stop and supporter 64 includes the mounting flange 62, a relatively wide and stiff supporting beam 67 integral therewith, and a pair of carrier engaging L-shaped fingers 68 and 70 integral therewith and separated from each other by a slot 72. As indicated in FIGURES 2 and 3, the web 40 of the carrier 36 is fitted in the slot 72 so that the angle fingers 68 and 70 are disposed on opposite sides of the web 40, and accordingly, one finger will aid in supporting the associated end of the associated carrier when the carrier is moving upwardly and the other finger will aid in supporting the carrier when the associated carrier is moving downwardly.

Thus, in accordance with the present invention, it will be apparent that the fingers 68 and 70 engage the web 40 at a point immediately adjacent the narrow flange 39 of the carrier, which edge of the carrier would otherwise be supported solely in a cantilever fashion by the bolts 66, and would impart excessive strains to the carrier flange 38 in the area adjacent the supporting bolts 66. By avoiding any welding and by using the angle fingers 68 and 70 for adding support to the carriers adjacent the narrow flanges 39 thereof, it has been found that the life span of the carriers is greatly increased. It will also be noted that the fingers serve as convenient container stops thereby preventing the containers supported by the carriers from contacting the bolts 66 or from moving out of the otherwise open ends of the carriers.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, we claim:

1. A carrier attachment apparatus for a processing conveyor of a hydrostatic cooker which conveyor includes a pair of spaced endless chains each defined by a plurality of pivotally interconnected links, and a plurality of equally spaced elongated carrier bars extending between said chains and secured to associated ones of said links, each of said carriers including an elongated mounting flange at one side thereof and having a container supporting web extending from said flange with an elongated retaining flange on the other side thereof, the improvement which comprises an inner link bar on each link, a tab integral with and bent inwardly from said link bar to lie in a plane substantially normal to the associated link, fastener means rigidly connecting one end of said mounting flange in cantilever fashion to said tab, and supporting means rigidly connected at one end to said link and having another end operatively connected to the carrier adjacent to the other side thereof for reducing the cantilever loading on said mounting flange to a minimum, said supporting means including a supporting beam having a flanged finger formed on said supporting beam at said other end and contacting said container supporting web immediately adjacent the retainer supporting flange of the carrier thereby providing beam support adjacent the retaining flange of the carrier.

2. A carrier attachment apparatus for a processing conveyor of a hydrostatic cooker which conveyor includes a pair of spaced endless chains each defined by a plurality of pivotally interconnected links, and a plurality of equally spaced elongated carrier bars extending between said chains and secured to associated ones of said links, each of said carriers including an elongated mounting flange at one side thereof and having a container supporting web extending from said flange with an elongated retaining flange on the other side thereof, the improvement which comprises an inner link bar on each link, a tab integral with and bent inwardly from said link bar to lie in a plane substantially normal to the associated link, fastener means rigidly connecting one end of said mounting flange in cantilever fashion to said tab, and supporting means rigidly connected at one end to said link and having another end operatively connected to the carrier adjacent to the other side thereof for reducing the cantilever loading on said mounting flange to a minimum, said supporting means including a supporting beam which is parallel to said link bar, and an L-shaped finger integrally formed on said supporting beams at said other end and contacting said container supporting web immediately adjacent the retainer supporting flange of the carrier thereby providing beam support adjacent the retaining flange of the carrier.

3. A carrier attachment apparatus for a processing conveyor of a hydrostatic cooker which conveyor includes a pair of spaced endless chains each defined by a plurality of pivotally interconnected links, and a plurality of equally spaced elongated carrier bars extending between said chains and secured to associated ones of said links, each of said carriers including an elongated mounting flange at one side thereof and having a container supporting web extending from said flange with an elongated retaining flange on the other side thereof, the improvement which comprises an inner link bar on each link, a tab integral with and bent inwardly from said link bar to lie in a plane substantially normal to the associated link, fastener means rigidly connecting one end of said mounting flange in cantilever fashion to said tab, and supporting means rigidly connected at one end to said link and having another end operatively connected to the carrier adjacent to the other side thereof for reducing the cantilever loading on said mounting flange to a minimum, said supporting means including a wide supporting beam which is parallel to said link bar, a pair of L-shaped fingers integrally formed on said supporting beam at said other end and separated from each other by a space, and wherein a portion of said container supporting web immediately adjacent the retaining flange of the carrier is positioned within said space thereby providing beam support at the retaining flange of the carrier.

4. An apparatus according to claim 3 wherein said supporting means includes a flange that is integral with and normal to said supporting beam and is clamped between said mounting flange and said tab.

5. An apparatus according to claim 4 wherein said fastener means is a bolt and nut.

6. An apparatus according to claim 3 wherein said L-shaped fingers include portions parallel with said link bar and serve as container stops to prevent containers from sliding out the ends of the carrier.

7. An improved processing conveyor for use in a hydrostatic cooker wherein the conveyor is subjected to substantial variations in pressure and temperature comprising, a pair of spaced parallel endless chains, each of said chains being formed of a plurality of pivotally interconnected links, a plurality of equally spaced elongated carriers disposed between said chains adjacent associated ones of said links, each of said carriers including an elongated mounting flange on one side thereof and having a container supporting web extending from said flange with a retaining flange on the other side thereof, said associated links each including an inner link bar lying in a predetermined plane, a tab integral with said bar and bent inwardly therefrom at an angle substantially normal to said predetermined plane, supporting means having a flange integrally formed on one end and a pair of L-shaped fingers integrally formed on the other end and separated by a space, and fastening means connecting one end of said elongated mounting flange to said supporting means flange and to the associated tab, a portion of said web adjacent said retaining flange being inserted in said space to provide support for the carrier adjacent said retaining flange.

References Cited

UNITED STATES PATENTS 1,872,629    8/1932    Fahrenwald.
3,160,262    12/1964    Nolte _____ 198—131 X

FOREIGN PATENTS 1,115,749    1/1956    France.
882,959    11/1961    Great Britain.

EVON C. BLUNK, *Primary Examiner.*

M. L. AJEMAN, *Assistant Examiner.*

UNITED STATES PATENT OFFICE
CERTIFICATE OF CORRECTION

Patent No. 3,394,793                                  July 30, 1968

James L. Reimers et al.

It is certified that error appears in the above identified patent and that said Letters Patent are hereby corrected as shown below:

Column 1, line 30, "designated" should read -- designed --.
Column 2, line 16, "producing" should read -- providing --.
Column 5, line 27, before "mounting" insert -- carrier --.

Signed and sealed this 17th day of March 1970.

(SEAL)
Attest:

Edward M. Fletcher, Jr.                         WILLIAM E. SCHUYLER, JR.

Attesting Officer                                             Commissioner of Patents